Figure 1:
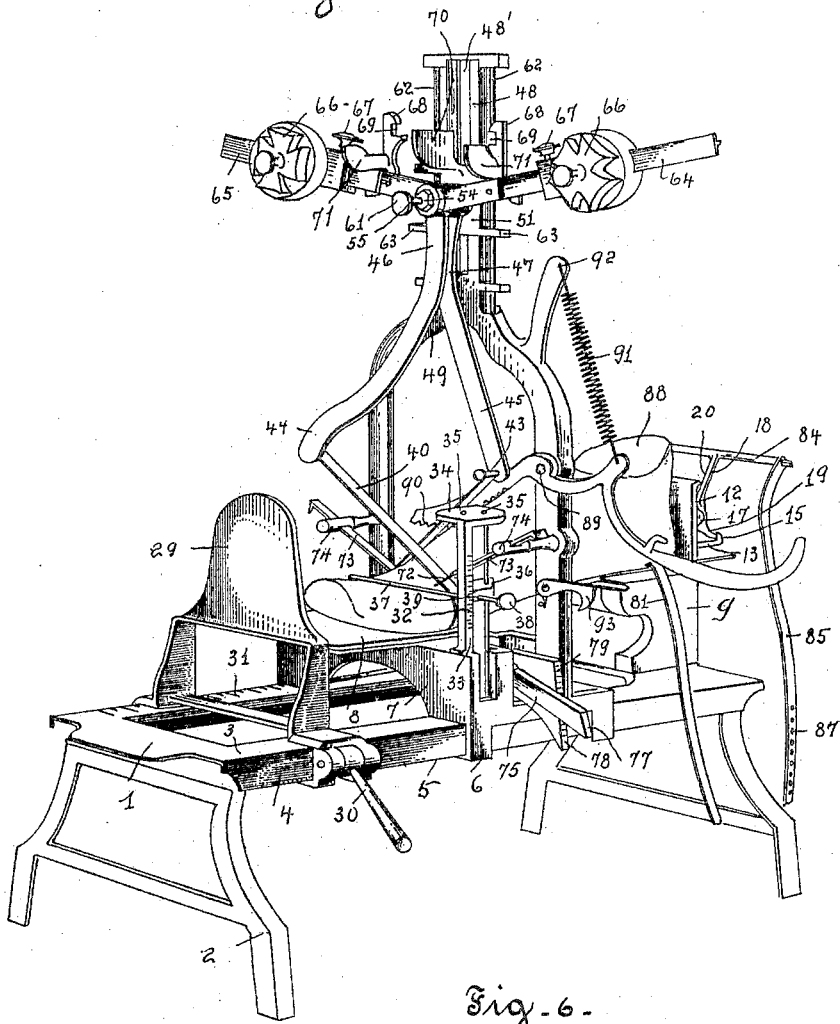

No. 797,611. PATENTED AUG. 22, 1905.
J. H. SCHAEFER.
MEASURING MACHINE FOR FEET AND LASTS.
APPLICATION FILED DEC. 12, 1902.

3 SHEETS—SHEET 1.

Witnesses—
L. M. Eddy.
H. F. MacLean.

Inventor—
Joseph H. Schaefer
By Wilson & Martin
his attorneys.

No. 797,611. PATENTED AUG. 22, 1905.
J. H. SCHAEFER.
MEASURING MACHINE FOR FEET AND LASTS.
APPLICATION FILED DEC. 12, 1902.
3 SHEETS—SHEET 2.
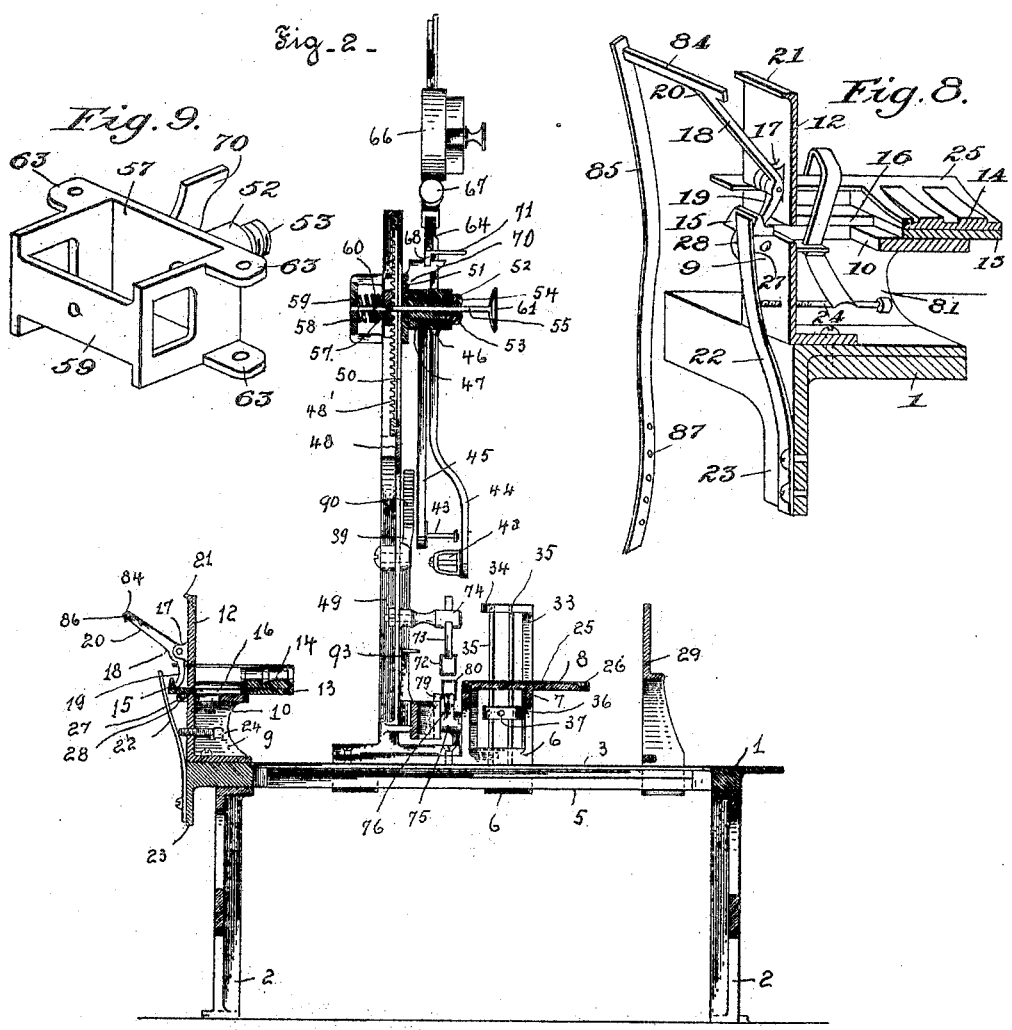
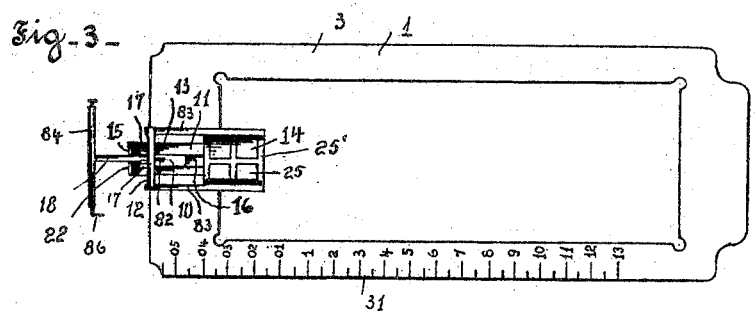
Witnesses
L. M. Eddy.
H. J. MacLane
Inventor
Joseph H Schaefer
By Wilson & Martin
his Attorneys No. 797,611. PATENTED AUG. 22, 1905.
J. H. SCHAEFER.
MEASURING MACHINE FOR FEET AND LASTS.
APPLICATION FILED DEC. 12, 1902.

3 SHEETS—SHEET 3.

Witnesses—
L. M. Eddy.
H. F. MacLane.

Inventor
Joseph H. Schaefer
By Wilson & Martin
his Attorneys

UNITED STATES PATENT OFFICE.

JOSEPH H. SCHAEFER, OF TOLEDO, OHIO.

MEASURING-MACHINE FOR FEET AND LASTS.

No. 797,611.    Specification of Letters Patent.    Patented Aug. 22, 1905.

Application filed December 12, 1902. Serial No. 134,901.

*To all whom it may concern:*

Be it known that I, JOSEPH H. SCHAEFER, a citizen of the United States, residing at Toledo, in the county of Lucas and State of Ohio, have invented a new and useful Improvement in Measuring-Machines for Feet and Lasts, of which the following is a specification.

My invention relates to a machine for measuring feet and shoe-lasts, and has for its object to provide an adjustable device of the kind by means of which an unskilled person can rapidly make accurate measurement of the human foot for length, height of instep, the arch, the heel, the height of the toes, the circumference of the foot at any point of the length of the foot, and the positions and size of possible deformities.

A further object is to adapt the machine to receive and secure a shoe-last in the position previously occupied by the foot, upon which shoe-last the recorded measurements of a foot can be compared with the measurements of the last and the difference noted at the identical points at which the foot was measured, whereby the last may be made to exactly conform thereto.

The objects of my invention are accomplished as hereinafter described, and illustrated in the drawings, in which—

Figure 6:
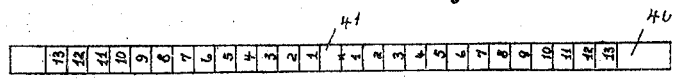
Figure 7:
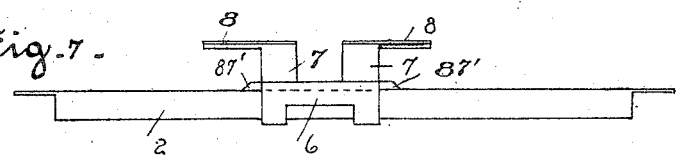
Figure 4:
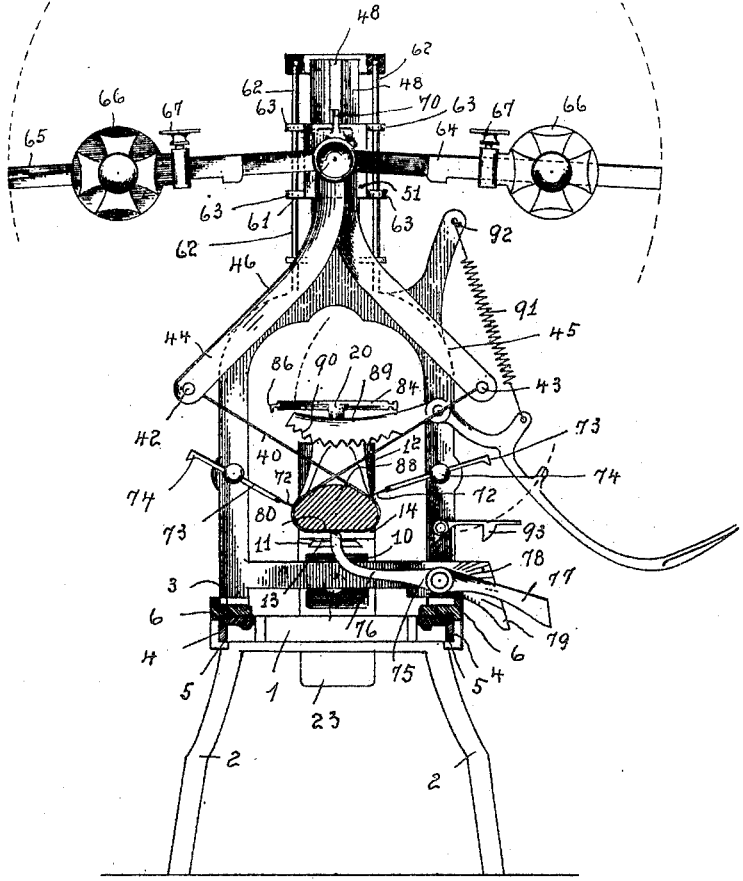
Figure 5:
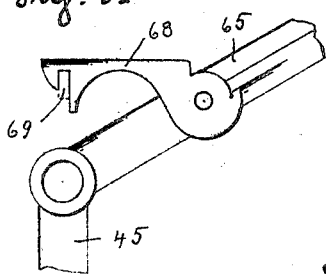

Figure 1 is a perspective view of my measuring-machine. Fig. 2 is a longitudinal vertical section through the same. Fig. 3 is a top plan view of the bed-plate. Fig. 4 is a transverse section through the traveler. Fig. 5 is a reverse view of one of the carrier-arms for the tape and locking-pawl. Fig. 6 is a plan view of the tape. Fig. 7 shows a projection formed upon the traveler to readily indicate the different points of the scale. Fig. 8 is a rear isometric view of the heel-standard, part in elevation and part in section; and Fig. 9 is a detail isometric view of the sleeve to which the bell-cranks are pivoted.

Referring to the drawings, the bed-plate 1 of my machine is supported upon standards 2, which are suitably secured to the ends of the bed-plate. The top 3, the sides 4, and bottom edges 5 of the bed-plate are finished to form parallel ways, upon each of which a U-shaped shoe 6 is mounted, which shoes are cross-connected at their front ends with an integral bar 7, preferably arranged in the form of an inverted box, and thereby form a traveler movable lengthwise upon the bed-plate. The cross-bar is of a suitable height and is formed with an integral plate 8, extending forward from the cross-bar, and is adapted to support the ball of a foot. At the rear end of the bed-plate and centrally to the width thereof there is mounted a box-like standard 9, having a side opening facing the traveler and provided with a slot 10 in the top. In the top of the standard there is also formed a dovetail groove 11, Fig. 4, extending lengthwise through the standard and through a vertically-projecting plate 12, Fig. 2, located at the rear of the standard and integral therewith and adapted to form a stop for the heel of the foot. Within the dovetail groove there is mounted a sliding plate 13, which is provided at the front end with an integral or attached plate 14, concaved to receive the heel of a foot. Sliding plate 13 extends a suitable distance to the rear of the stop-plate 12 and is provided at the rear end with a vertically-projecting lug 15, arranged transversely across the top of the plate. With the lug 15 near the back of the heel stop-plate 12 the concaved heel-plate 14 is a suitable distance from the front of the heel-stop, and the intervening section of the plate 13 between the heel stop-plate 12 and the heel-plate 14 is provided with an elongated slot 16 in line with the slot 10, formed in top of the standard. A suitable distance above the slot for the plate 13 and on the rear side of the heel-stop are formed lugs 17, to which a lever 18 is pivoted, with the arms arranged at an angle to each other and of which the arm 19 is adapted to engage with the lug 15 by pressing the free arm 20 of the lever toward the back of the heel-stop, and thereby draw the heel-plate toward the stop without covering the slot 10 in the top of the standard, and the inward movement of the lever-arm 20 is limited by a rearward projecting shoulder 21 integral with the heel stop-plate. When not in use to support the heel, the concaved heel-plate 14 is held away from the stop 12 by means of a leaf-spring 22 contacting with the end of the sliding plate. The spring is secured to a lug 23 integral with the bed-plate, and the inward movement of the sliding plate 13 is adjusted by providing a thumb-screw 24, run in the rear wall of the standard and adjustably contacting with the spring. The heel-plate and the foot-plate are arranged in the same plane and are preferably faced with a suitable fabric 25, which is held in position on the plates by means of rim-plates 25' and 26 let into the respective margins. The rear portion of the sliding plate 13 is preferably supported upon a roller 27, which is journaled in bearings formed in lugs 28, projecting from the rear of the heel-plate.

Upon the front end of the bed-plate there is mounted a toe-block 29, which is locked at any point to the bed-plate by means of the cam-lever 30. Upon the top of one of the ways of the bed-plate there is formed a scale 31, (shown in Fig. 3,) by means of which the sizes of feet for children and adults of both sexes can be measured by adjusting the toe-block to the length of a foot supported upon the heel and the foot plate.

For measuring the height of the toes of a foot I have provided a scale 32, which is formed upon a standard 33, mounted upon one end of the cross-bar 7. At the top the standard is provided with an integral ledge 34, which projects from the standard toward the foot-plate in a position to secure the top ends of the vertically-parallel rods 35, the bottom ends of which are suitably secured in orifices formed in the top of the U-shoe. The rods 35 operate as guides for a holder 36, which is movably mounted thereon, and the holder is provided with a suitable lateral orifice to receive an indicator-rod 37, which may be moved through the holder, and provided at the outer end with a handle 38. The holder is provided with an index-point 39 to clearly indicate the divisions upon the scale when the indicator-rod is adjusted through the holder to rest upon the top of the toes of a foot in the machine. To house the holder and the rod under the foot-plate when not in use, the top and the end of the cross-bar 7 is suitably slotted for passing the holder and the indicator-rod below the top of the cross-bar.

To measure the circumference of a foot, I have provided a tape 40, upon which the divisions of the scale 41, Fig. 6, are arranged to measure each way from a divisional point. The ends of the tape are attached to suitable holders 42 and 43, which are secured to the respective ends of arms 44 and 45 of bell-cranks 46 and 47. The end of arm 44 is curved away from the arm 45 sufficiently to provide a space for the tape and tape-holders between the arms, and to allow the tape to be freely crossed the curved end of arm 44 is extended to dispose the holder 42, Fig. 2, at the end of the arm 44 below the holder 43 at the end of the arm 45.

The bell-cranks are pivotally supported upon a standard 48, which projects vertically from an arch 49, suitably mounted on the traveler spanning the foot-plate. Standard 48 is provided with a ratchet-plate 48', which is secured to the rear of the stem, and with a vertically-elongated slot 50, extending through the standard and the ratchet-plates. A sleeve 51, Fig. 9, is mounted upon the standard and provided with a projecting gudgeon 52, upon which the bell-cranks are pivoted. The gudgeon is provided with a diametrically-reduced end portion 53, which is threaded to receive a nut 54 to hold the cranks in position. The body portion of the gudgeon is provided with an axial bore in which a rod 55 is movably inserted and which projects through the elongated slot 50, formed in the stem and the ratchet-plate, and has secured thereto a lock-plate 57, which is serrated to engage the ratchet-plate to prevent the downward movement of the sleeve. The lock-plate 57 is pressed into engagement with the teeth of the ratchet-plate by means of a spring 58, interposed between the lock-plate and the rear wall 59 of the sleeve. The spring 58 is held in position by a boss 60 integral with the locking-plate. The rod 55 may be extended through the rear wall of the sleeve and is provided with a button 61 in front of the bell-cranks. By pushing the button toward the stem the ratchet-lock is disengaged from the ratchet-plate, upon which the bearing-sleeve may be lowered to adjust the position of the ends of the arms 44 and 45 in relation to the height of a foot or a particular point of measurement thereon, and by releasing the button spring 58 presses the locking-plate to reëngage the ratchet-plate. In the raising movement of the sleeve the spring 58 yields to the disengaging movement of the locking-plate imparted thereto by the inclined sides of the ratchet-teeth.

The sleeve is guided by means of rods 62, Fig. 4, which are arranged in parallel alinement on opposite sides of the standard and suitably secured at the top of the standard and the top of the arch and inserted through orifices formed in the lugs 63, integral with the sleeve and projecting therefrom at the top and the bottom on opposite sides thereof. The free arms 64 and 65 of the bell-cranks 46 and 47 are arranged at such an angle to the respective arms 44 and 45 that when arms 44 and 45 are crossed, as shown in Fig. 4, the arms 64 and 65 are nearly in a horizontal position.

Arms 64 and 65 are arranged to receive thereon movable weights 66, which may be secured in position upon the arm by means of thumb-screws 67, threaded to the weights. Near the pivot of the bell-cranks there is secured to the rear of each weight-arm a latch-dog 68, Figs. 1, 5, and 9, which being provided with an incut 69 is adapted to engage a common catch 70, Figs. 1, 2, and 9, when the weight-arms are raised to open the tape-arms 44 and 45 to the normal position. Both dogs are provided with lips 71, extending to the front over the top of the weight-arms to provide handles for disengaging the dogs from the catch to lower the weight-arms and transfer the ends of the arms 44 and 45 from the position normally occupied by the opposite arms, and thereby cross the measuring-tape. The measuring-tape is held in line by means of links 72 encircling the tape and pivoted to the end of guide-bars 73, which are movably mounted in stems 74, revolubly attached to the sides of the arch.

To measure the height of the arch of a foot, I have provided an arm 75, Fig. 4, which is so pivoted to the side of the cross-bar 7 that the inner end portion 76 may contact with the arch of the foot and the outer portions 77 operate as an indicator for a scale 78, formed upon a plate 79, projecting outward from the traveler, and the end 76 is also provided with a link 80, encircling the measuring-tape 40.

The heel-measuring tape 81 is centrally of its length attached to a holder 82, which is secured to the standard 9 and extends through the slots 10 and 16 to support the tape in line with bottom of the concaved heel-plate 14, and to support the free portions of the tape the rim-plate 25 is provided with integral plates 83, extending from opposite sides of the heel-plate toward the heel-stop, the edges of which are suitably notched to receive the extending plates. The free arm 20 of the lever 18 is provided with a cross-arm 84, to one end of which an ankle-strap 85 is suitably secured. The opposite end of the strap may be attached to the opposite end of the cross-arm, which is provided with a hook portion 86, Fig. 3, adapted to engage one of the perforations 87, formed through the body of the strap.

In the use of my measuring-machine a foot is placed upon the heel-plate and held over the ankle to the cross-arm 84 by means of the strap 85, which results in drawing the heel against the stop, in which position the foot is secured to the machine by engaging one of the perforations of the strap in the hooked end of the cross-arm. The toe-block may now be moved upon the bed-plate to contact with the toes and the length of the foot noted upon the scale formed upon the bed-plate, after which the block is withdrawn. The traveler is now moved to any desired point of measurement, the position of which is indicated by the index-point 87', Fig. 7, extending from the traveler. When the position of measurement has been noted, the bell-crank dogs are released from the standard, and the weight-arms are lowered to cross the tape over the foot, and the crossing-point of the tape is adjusted by raising or lowering the sleeve to which the bell-cranks are pivotally mounted. In shifting the traveler to particular points in the length of the foot the measuring-tape is freed from the foot by lifting and locking the weight-arms of the bell-crank in a raised position. The circumference of the foot may thus be measured at any desired point, the height of the toes measured by the indicator 37 and scale 32, the arch of the foot is measured by means of the arm 75 and the scale 78, and the heel is measured by the tape 81. When all the required measurements of the foot are made, the foot is released from the machine and the data thus prepared are checked upon the last 88, which is locked in the machine in the position previously occupied by the foot by compressing the last between the heel-stop and the toe-block, which latter is locked to the bed-plate by the cam-lever. To provide for securing the last while the toe-block is released, I have pivoted to the rear side of one arm of the arch a lever 89, which is suitably curved and provided at one end with serrations 90. The serrated end is forced to grip the instep of the last by means of a spring 91, attached to the opposite end of the lever and to a bracket 92, projecting from the arch. When not in use, the lever is locked to the side of the arch by means of a latch 93 engaging a hook portion suitably formed on the lever.

What I claim to be new is—

1. In a foot-measuring machine, the combination of the bed or table, a heel-standard mounted on the rear end of the table and having a heel-stop projecting above the standard, a heel-plate movably mounted on the standard having a slot coinciding with the slot in the standard, a lever mounted on the back of the heel-stop and adapted to engage the heel-plate, an ankle-strap secured to the lever, a tape-holder secured to the standard and projecting through the slot of the standard and into the slot of the heel-plate, and a measuring-tape centrally secured to the holder, substantially as shown and described.

2. In a foot-measuring machine, the combination of the bed or table having sides and bottom edges forming parallel ways, a traveler movably mounted on the ways, a foot-plate mounted on the traveler, an arch mounted on the traveler over the foot-plate supporting a standard central above the arch, a sleeve adjustably mounted on the standard having pivotally mounted thereon weighted and oppositely-disposed bell-crank tension-arms, means to lock the sleeve against downward movement at any point on the standard and permit free upward movement, and a measuring-tape having its ends secured one to an end of each bell-crank arm.

3. The combination with a bed-plate of the heel-standard 9 having the heel-stop 12 and a slotted and grooved top, the heel-plate 14 slotted and movable along the groove of the standard, the lever 18 engaging the heel-plate, and fulcrumed to the heel-stop, and provided with an ankle-strap, the spring 22 engaging the heel-plate and the heel-measuring tape 81, substantially as shown and described.

4. The combination with a bed-plate, of a traveler movably mounted on the bed-plate and provided with the foot-plate 8, the arch 49 over the foot-plate having the slotted standard 48 provided with the ratchet-plate 48', the sleeve 51 mounted on the standard and provided with the spring-pressed lock-plate 57 engaging the ratchet-plate, the push-rod 55 engaging the lock-plate, the gudgeon 52, the adjustably-weighted bell-crank tension-arms 44 and 45 oppositely mounted on the gudgeon, the measuring-tape 40 secured by an end to each arm, and centrally linked to the arch-measuring lever 75, substantially as shown and described.

5. In a foot and last measuring machine, the combination with a bed-plate, of a traveler movably mounted on the bed-plate, a foot-plate mounted on the traveler, an arch mounted on the traveler spanning the foot-plate, a serrated last-holder pivoted to the arch transversely to the foot-plate, having a handle portion extending oppositely from the pivot, a spring engaging the handle portion and adapted to normally depress the holder, and a latch adapted to engage the handle when depressed, and secure the holder in a raised position, substantially as set forth.

In witness whereof I have hereunto set my hand this 22d day of November, A. D. 1902.

JOSEPH H. SCHAEFER.

Witnesses:
  WILLIAM H. MOOR,
  LAURA YOUNGS.